United States Patent
Tachibana et al.

(10) Patent No.: US 12,323,032 B2
(45) Date of Patent: Jun. 3, 2025

(54) MOTOR

(71) Applicant: Nidec Corporation, Kyoto (JP)

(72) Inventors: Yu Tachibana, Kyoto (JP); Tomohiro Hasegawa, Kyoto (JP); Yoichi Sekii, Kyoto (JP); Masahiro Otani, Kyoto (JP); Hiroaki Hirano, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 541 days.

(21) Appl. No.: 17/679,416

(22) Filed: Feb. 24, 2022

(65) Prior Publication Data
US 2022/0278589 A1 Sep. 1, 2022

(30) Foreign Application Priority Data
Feb. 26, 2021 (JP) .................. 2021-030894

(51) Int. Cl.
| H02K 7/00 | (2006.01) |
| H02K 3/50 | (2006.01) |
| H02K 5/24 | (2006.01) |
| H02K 7/08 | (2006.01) |

(52) U.S. Cl.
CPC ............... H02K 7/003 (2013.01); H02K 3/50 (2013.01); H02K 5/24 (2013.01); H02K 7/083 (2013.01); *H02K 2203/06* (2013.01)

(58) Field of Classification Search
CPC ............ H02K 7/003; H02K 3/50; H02K 5/24; H02K 7/083; H02K 2203/06
See application file for complete search history.

(56) References Cited

U.S. PATENT DOCUMENTS

| 2003/0234586 A1* | 12/2003 | Iwase ................ H02K 3/47 |
| | | 310/194 |
| 2005/0062353 A1* | 3/2005 | Brown ............... H02K 7/085 |
| | | 310/156.11 |
| 2009/0224617 A1 | 9/2009 | Bottger et al. |

FOREIGN PATENT DOCUMENTS

| CN | 101378210 | * | 3/2009 | ............ H02K 3/52 |
| CN | 110994819 A | | 4/2020 | |
| JP | H06205554 A | | 7/1994 | |
| JP | H09215294 A | | 8/1997 | |
| JP | H10127004 A | | 5/1998 | |
| JP | H10248222 A | | 9/1998 | |
| JP | 2000014065 A | | 1/2000 | |
| JP | 2001069738 A | | 3/2001 | |
| JP | 2004-521589 A | | 7/2004 | |
| JP | 2007318962 A | | 12/2007 | |
| JP | 2009-213348 A | | 9/2009 | |
| WO | 02/065615 A2 | | 8/2002 | |

* cited by examiner

*Primary Examiner* — Terrance L Kenerly
(74) *Attorney, Agent, or Firm* — Keating & Bennett, LLP

(57) ABSTRACT

A motor includes a shaft centered on a central axis that extends vertically, a bearing that supports the shaft, and a stator including a coil radially opposing an outer peripheral surface of the shaft. The shaft includes a magnetization pattern in which at least two or more poles of N and S poles are alternately arranged in a circumferential direction.

16 Claims, 7 Drawing Sheets

[Fig. 1]
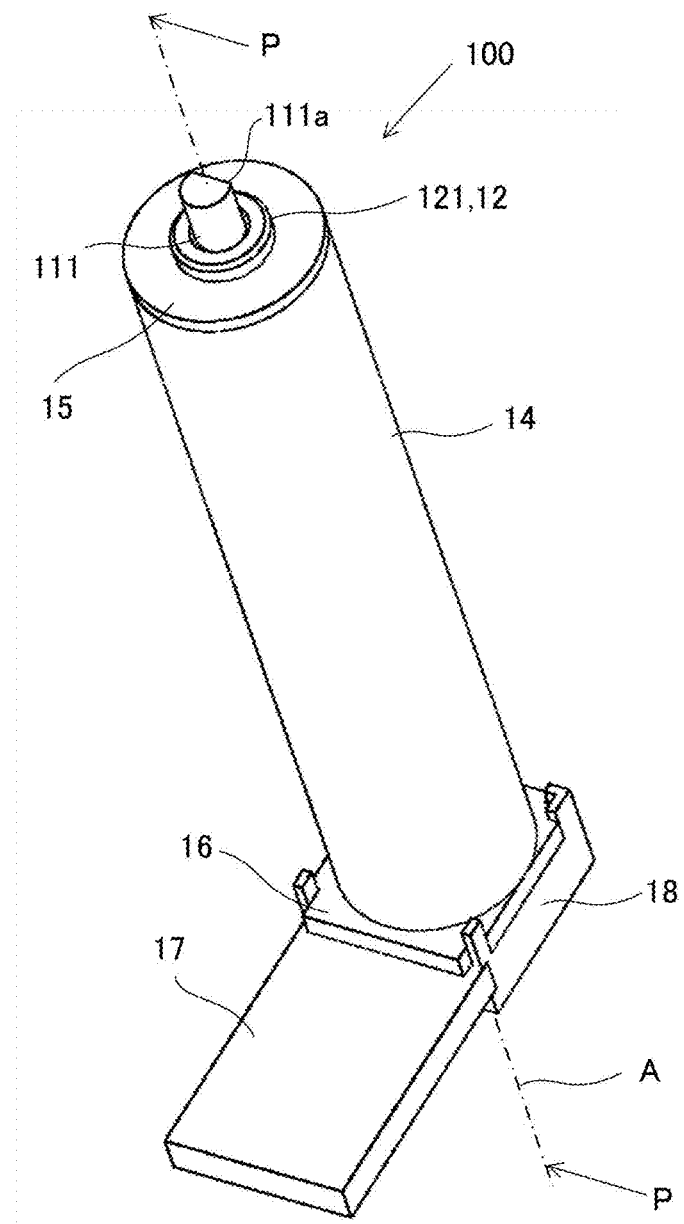

[Fig.2]
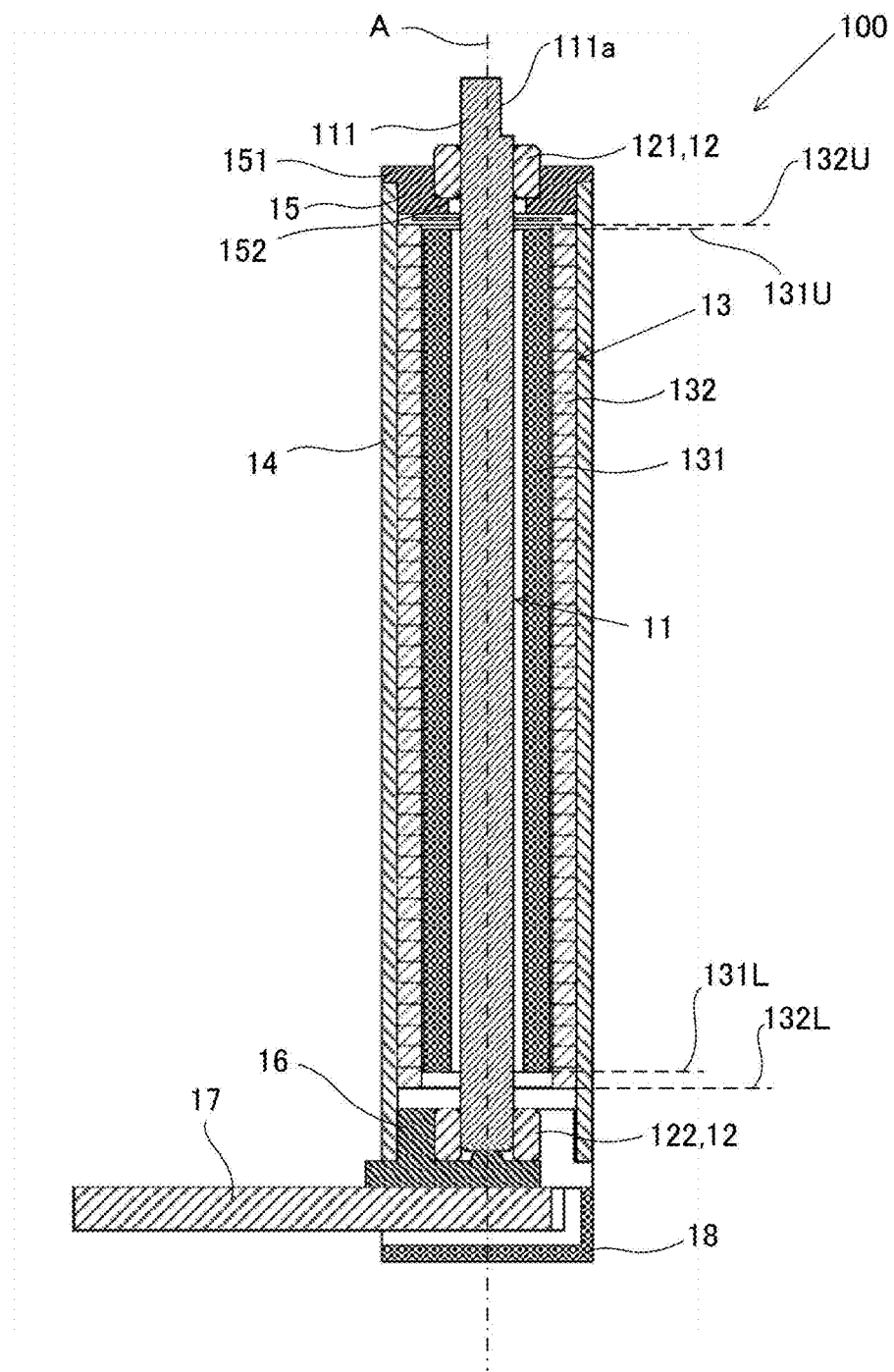

[Fig.3]
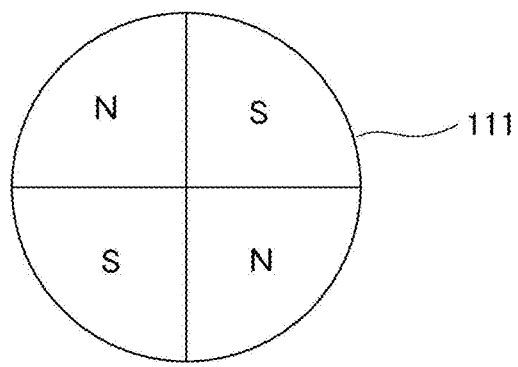
[Fig.4]
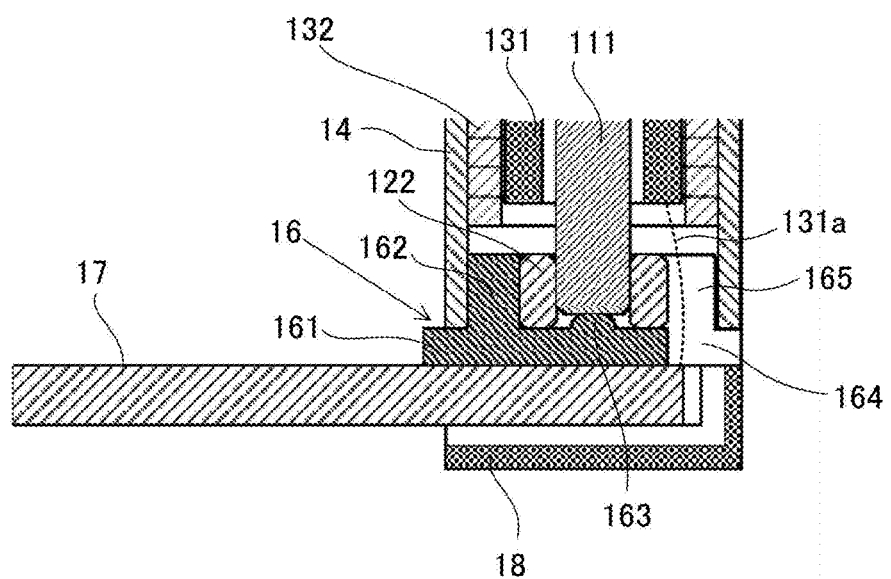

[Fig.5]
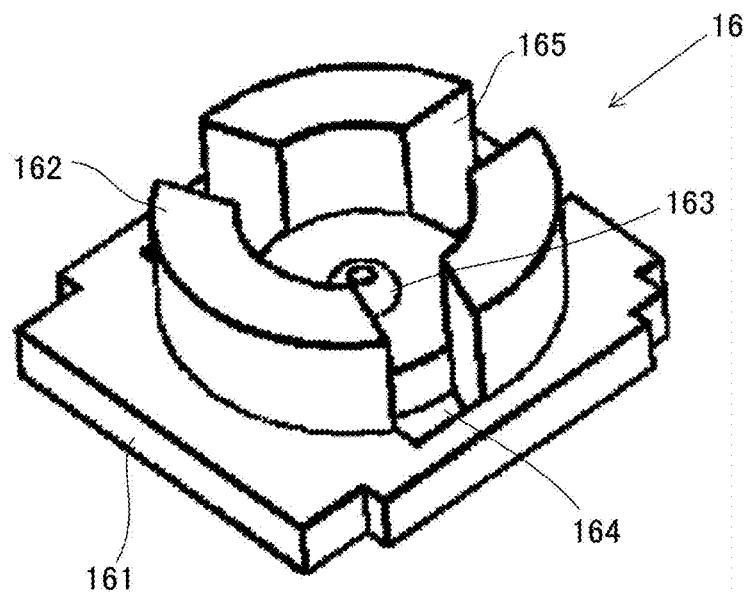
[Fig.6]
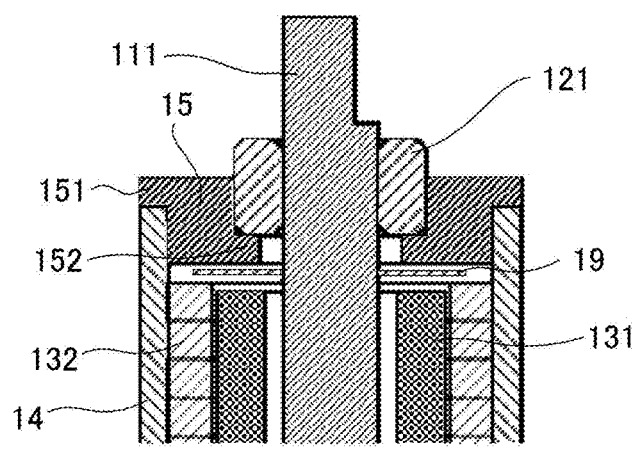

【Fig.7】
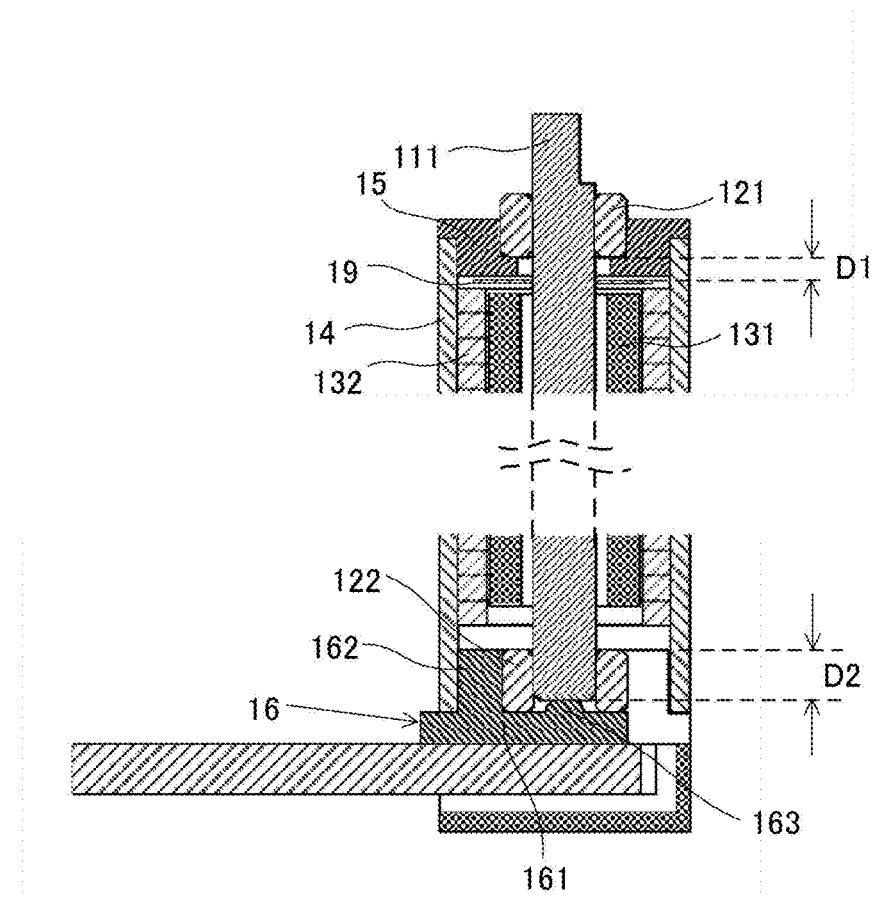

[Fig.8]
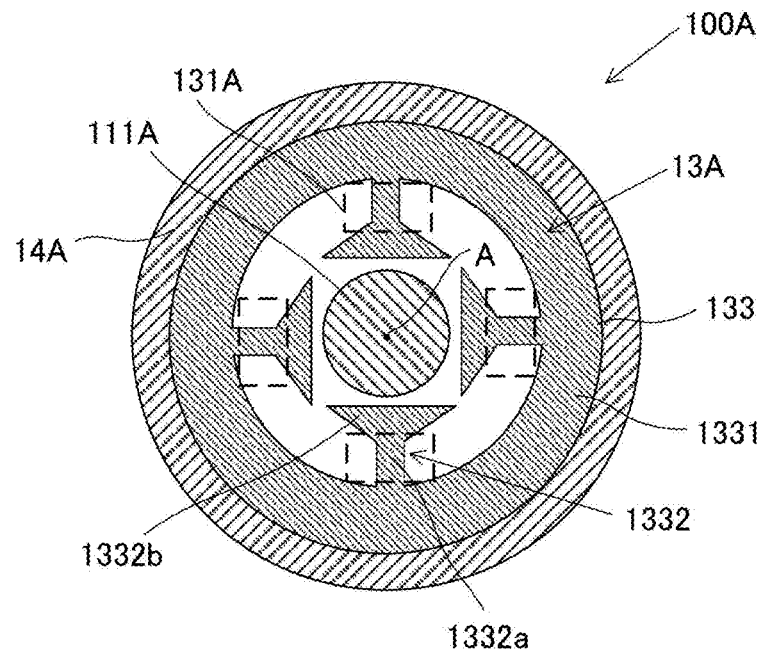
[Fig.9]
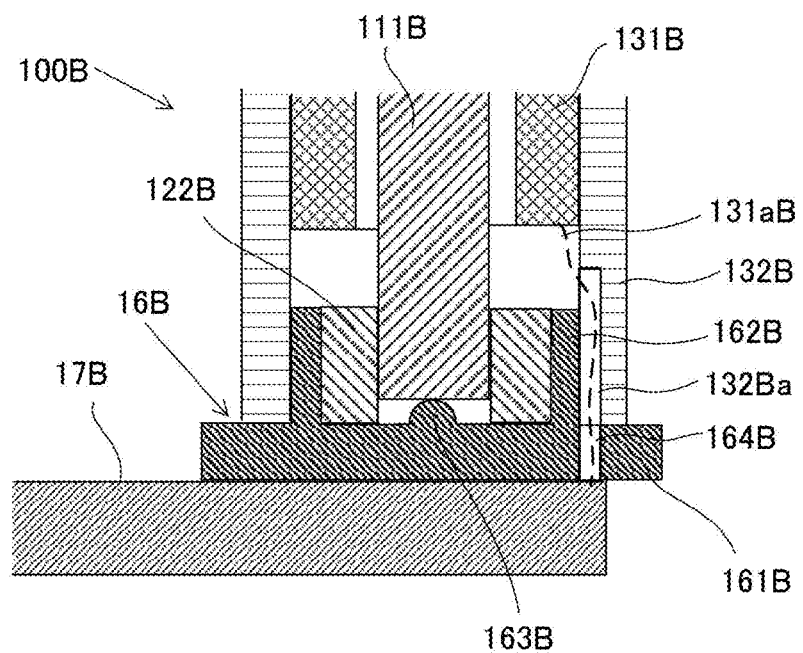

[Fig.10]
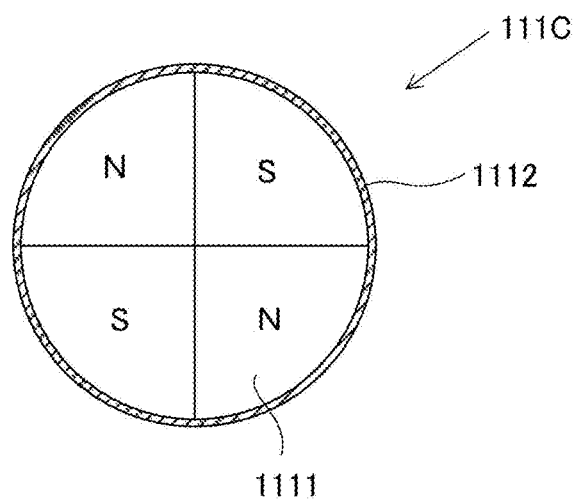

MOTOR

CROSS-REFERENCE TO RELATED APPLICATIONS

The present application claims priority under 35 U.S.C. § 119 to Japanese Patent Application No. 2021-030894, filed on Feb. 26, 2021, the entire contents of which are hereby incorporated herein by reference.

1. FIELD OF THE INVENTION

The present disclosure relates to a motor.

2. BACKGROUND

Conventionally, there is known a linear stepper motor which includes a stator and an axially extending, cylindrical, permanent magnet shaft magnetically interacting with the stator, the shaft having a smooth external surface along a portion thereof with axially alternating N and S poles arranged in the radial direction on the surface.

Conventionally, an inner rotor motor is known. The inner rotor motor includes a stator and a rotor enclosed by the stator. The rotor includes a plurality of permanent magnets attached to a shaft with a magnet carrier interposed therebetween.

For example, in a case where a geared motor using the inner rotor motor is downsized, there is a possibility that a shaft to which a gear is attached becomes thin and the shaft is likely to be twisted. In addition, there is a possibility that it becomes difficult to assemble the motor as the size is reduced.

SUMMARY

A motor according to an example embodiment of the present disclosure includes a shaft centered on a central axis that extends vertically, a bearing that supports the shaft, and a stator including a coil radially opposing an outer peripheral surface of the shaft. The shaft includes a magnetization pattern in which at least two or more poles of N and S poles are alternately arranged in a circumferential direction.

The above and other elements, features, steps, characteristics and advantages of the present disclosure will become more apparent from the following detailed description of the example embodiments with reference to the attached drawings.

BRIEF DESCRIPTION OF THE DRAWINGS

FIG. 1 is a schematic perspective view illustrating a configuration of a motor according to an example embodiment of the present disclosure.

FIG. 2 is a longitudinal sectional view of the motor illustrated in FIG. 1 taken along a plane including a central axis.

FIG. 3 is a schematic view illustrating an example of a magnetization pattern of a shaft according to an example embodiment of the present disclosure.

FIG. 4 is a schematic sectional view illustrating, in an enlarged manner, a lower bush and a periphery thereof according to an example embodiment of the present disclosure.

FIG. 5 is a schematic perspective view illustrating a configuration of the lower bush.

FIG. 6 is a schematic sectional view illustrating, in an enlarged manner, a configuration of an upper portion of the motor according to an example embodiment of the present disclosure.

FIG. 7 is a schematic view describing a preferable structure of the motor.

FIG. 8 is a view describing a first modification of the motor according to an example embodiment of the present disclosure.

FIG. 9 is a view describing a second modification of the motor according to an example embodiment of the present disclosure.

FIG. 10 is a view describing a third modification of the motor according to an example embodiment of the present disclosure.

DETAILED DESCRIPTION

Hereinafter, example embodiments of the present disclosure will be described in detail with reference to the drawings. In the present description, a direction in which a central axis A of a motor 100 illustrated in FIGS. 1 and 2 extends is simply referred to as an "axial direction", "axial", or "axially". A radial direction and a circumferential direction about the central axis A of the motor 100 are simply referred to as a "radial direction", "radial", or "radially" and "circumferential direction", "circumferential", or "circumferentially", respectively. In the present description, the axial direction when the motor 100 is arranged in the direction illustrated in FIG. 2 is defined as the vertical direction. Note that a vertical direction is a name simply used for a description, and does not limit an actual positional relationship and a direction.

FIG. 1 is a schematic perspective view illustrating a configuration of the motor 100 according to an example embodiment of the present disclosure. FIG. 2 is a longitudinal sectional view of the motor 100 illustrated in FIG. 1 taken along a plane including the central axis A. Specifically, FIG. 2 is a schematic sectional view taken along the plane orthogonal to a P direction illustrated in FIG. 1. As illustrated in FIGS. 1 and 2, the motor 100 includes a rotor 11. The motor 100 further includes a bearing 12 and a stator 13.

The rotor 11 has a shaft 111 centered on the central axis A extending vertically. That is, the motor 100 includes the shaft 111. The rotor 11 is provided so as to be rotatable about the central axis A. The rotor 11 is a rotor that generates a magnetic field as will be described later. The shaft 111 has a pillar shape extending in the vertical direction, and specifically has a columnar shape. In the motor 100 of the present example embodiment, a gear (not illustrated) is attached to an upper end portion of the shaft 111. The gear is included in, for example, a speed reducer. The motor 100 is a so-called geared motor.

In the present example embodiment, the shaft 111 has a shaft cutout portion 111a extending in the axial direction at the upper end portion. Since the shaft cutout portion 111a is provided, the upper end portion of the shaft 111 has a D shape in plan view from the axial direction. Since the shaft cutout portion 111a is provided, the gear attached to the upper end portion of the shaft 111 can be made difficult to rotate with respect to the shaft 111. However, the shaft cutout portion 111a is not necessarily provided. In such a case, for example, the rotation of the gear with respect to the shaft 111 may be suppressed by press-fitting the gear into the shaft 111.

The bearing 12 supports the shaft 111. Specifically, the bearing 12 rotatably supports the shaft 111. In the present example embodiment, the bearing 12 includes an upper bearing 121 and a lower bearing 122. The upper bearing 121 is arranged radially outward of the shaft 111 and supports an upper portion of the shaft 111. The lower bearing 122 is arranged radially outward of the shaft 111 and supports a lower portion of the shaft 111.

The upper bearing 121 and the lower bearing 122 are cylindrical. Inner peripheral surfaces of the upper bearing 121 and the lower bearing 122 face an outer peripheral surface of the shaft 111 in the radial direction. The upper bearing 121 and the lower bearing 122 may be, for example, sleeve bearings or ball bearings. In the present example embodiment, the upper bearing 121 and the lower bearing 122 are sleeve bearings. Grease may be arranged between each of the bearings 121 and 122 and the shaft 111 in the radial direction. The sleeve bearing may be made of, for example, a metal sintered body or resin such as polyacetal.

The stator 13 is an armature of the motor 100. The stator 13 faces the rotor 11 in the radial direction and surrounds the rotor 11. That is, the motor 100 is an inner rotor motor. The stator 13 includes a coil 131 that faces the rotor 11 in the radial direction. The stator 13 may include, for example, a stator core or a back yoke. In the present example embodiment, the stator 13 includes an air-core coil forming the above-described coil 131 and a back yoke 132.

The air-core coil 131 has a cylindrical shape extending in the axial direction. Specifically, the air-core coil 131 has a cylindrical shape centered on the central axis A. The air-core coil 131 is arranged at an interval from the rotor 11 in the radial direction and surrounds an outer peripheral surface of the rotor 11. The air-core coil 131 is a field coil. When a drive current is supplied to the air-core coil 131, circumferential torque is generated in the rotor 11, and the rotor 11 rotates about the central axis A.

The back yoke 132 is arranged radially outward of the air-core coil 131 and has a cylindrical shape extending in the axial direction. Specifically, the back yoke 132 has a cylindrical shape centered on the central axis A. The back yoke 132 includes a plurality of magnetic steel plates laminated in the axial direction. In the present example embodiment, the back yoke 132 is formed by laminating the plurality of magnetic steel plates each having a circular shape in the axial direction. An inner peripheral surface of the back yoke 132 faces an outer peripheral surface of the air-core coil 131 in the radial direction and surrounds the air-core coil 131. The outer peripheral surface of the air-core coil 131 is fixed to the inner peripheral surface of the back yoke 132. For example, the air-core coil 131 is fixed to the back yoke 132 using an adhesive. The air-core coil 131 and the back yoke 132 are arranged between the upper bearing 121 and the lower bearing 122 in the axial direction.

When the stator 13 is configured using the air-core coil 131 and the back yoke 132 as in the present example embodiment, the stator 13 can be easily assembled by inserting the air-core coil 131 into the back yoke 132. That is, the assemblability of the motor 100 can be improved according to such a configuration. Since the back yoke 132 is configured by laminating the magnetic steel plates, it is possible to suppress an eddy current and to suppress a decrease in rotation efficiency of the rotor 11.

In the present example embodiment, as a preferable mode, an upper end 131U and a lower end 131L of the air-core coil 131 are arranged between an upper end 132U and a lower end 132L of the back yoke 132 in the axial direction. According to such a configuration, a magnetic flux generated by causing the drive current to flow through the air-core coil 131 can be efficiently passed through the back yoke 132, and magnetic characteristics of the motor 100 can be improved.

The motor 100 further includes a case 14 and a lower bush 16. The motor 100 further includes an upper bush 15.

The case 14 is arranged radially outward of the stator 13 and surrounds the stator 13. Specifically, the case 14 has a cylindrical shape extending in the axial direction. In the present example embodiment, the case 14 has a cylindrical shape centered on the central axis A. An inner peripheral surface of the case 14 faces an outer peripheral surface of the back yoke 132 in the radial direction and surrounds the outer peripheral surface of the back yoke 132. Since the motor 100 includes the case 14, the stator 13 can be covered and protected.

Note that the motor 100 may be configured without providing the case 14. As a result, the motor 100 can be downsized. The case 14 is made of, for example, metal or resin. For example, when the case 14 is made of metal, the rigidity of the motor 100 can be enhanced. For example, when the case 14 is configured using an insulator, the leakage of the magnetic flux can be suppressed. For example, the inner peripheral surface of the case 14 may be fixed to the outer peripheral surface of the back yoke 132 using an adhesive. When the case 14 is made of resin, the case 14 and the back yoke 132 may be formed as a single member by insert molding.

The upper bush 15 holds the upper bearing 121. The upper bush 15 has a cylindrical shape extending in the axial direction. In the present example embodiment, the upper bush 15 has a cylindrical shape centered on the central axis A. Specifically, the upper bush 15 has a bush flange portion 151, which has an annular shape and protrudes radially outward from an outer peripheral surface, in an upper end portion. In addition, the upper bush 15 has a bush inner annular portion 152, which has an annular shape and protrudes radially inward from an inner peripheral surface, in a lower end portion.

The upper bush 15 is fitted into the case 14 from an upper portion of the cylindrical case 14. The upper bush 15 is fitted into the case 14 until the bush flange portion 151 abuts against an upper end of the case 14. In addition, the upper bearing 121 is fitted into the upper bush 15 from an upper portion of the cylindrical upper bush 15. The upper bearing 121 is fitted to such a position as to abut against an upper end of the bush inner annular portion 152. The upper bearing 121 may be fixed to the upper bush 15 by, for example, press-fitting, press-fitting adhesion, or caulking.

In the present example embodiment, a part of the upper bearing 121 protrudes upward from the upper bush 15. With such a configuration, for example, the upper bearing 121 can be used for positioning of a gear box (not illustrated) and the like arranged in an upper portion of the motor 100. Note that the upper bush 15 does not necessarily have at least one of the bush flange portion 151 and the bush inner annular portion 152.

The lower bush 16 holds the lower bearing 122. The lower bush 16 has a portion fitted into the case 14 from a lower portion of the cylindrical case 14. A detailed configuration of the lower bush 16 will be described later. The upper bush 15 and the lower bush 16 are made of, for example, metal or resin. The upper bush 15 and the lower bush 16 are fixed to the case 14 using, for example, an adhesive. When the case 14 and the bushes 15 and 16 are made of resin, the case 14 and the bushes 15 and 16 may be fixed by deposition. When the case 14 and the bushes 15 and 16 are made of metal, the case 14 and the bushes 15 and 16 may be fixed by welding.

The shaft 111 has a magnetization pattern in which at least two or more poles of N and S poles are alternately arranged in a circumferential direction. That is, the shaft 111 also functions as a magnet. For this reason, the rotor 11 does not include a magnet that is a separate member from the shaft 111. The coil 131 faces the outer peripheral surface of the shaft 111 in the radial direction. Specifically, the air-core coil 131 faces the shaft 111 at an interval in the radial direction.

When the shaft 111 has the function of the magnet as described above, a radial size of the motor 100 can be reduced as compared with a configuration in which a shaft and a magnet are separate members. According to such a configuration, in a case of having the same size as a motor configured to include the shaft and the magnet as separate members, the shaft 111 can be thickened, and the rigidity of the shaft 111 can be improved. That is, according to such a configuration, even in a case where the size of the motor 100 is small, the shaft 111 can be made less likely to be twisted, and the reliability of the motor 100 can be improved. According to such a configuration, it is unnecessary to arrange the magnet separately from the shaft 111, and thus, the number of parts can be reduced, and it is possible to improve the assemblability of the motor 100 and to reduce the cost.

FIG. 3 is a schematic view illustrating an example of the magnetization pattern of the shaft 111. FIG. 3 illustrates the magnetization pattern of a cross section of the shaft 111 taken along a plane orthogonal to the axial direction. In the example illustrated in FIG. 3, the shaft 111 has the magnetization pattern in which four poles of N and S poles are arranged in the circumferential direction. However, the magnetization pattern is an example, and the number of poles arranged in the circumferential direction may be various numbers of poles such as two poles, six poles, and eight poles.

The shaft 111 may be made of a material that can be magnetized. The shaft 111 may be made of, for example, a rare earth magnet such as a neodymium magnet containing neodymium, iron, or boron as a main component. The shaft 111 may be configured to be entirely magnetized. However, the shaft 111 may be configured to be partially magnetized. In the shaft 111, at least a region facing the air-core coil 131 in the radial direction is preferably magnetized. That is, an axial range in which a magnetic pole pattern of the shaft 111 is formed is preferably a range overlapping the coil 131 in the radial direction. When the axial range in which the magnetic pole pattern of the shaft 111 is formed is only the range overlapping the coil 131 in the radial direction, it is possible to reduce the influence of iron loss generated in the bearing 21 or the bushes 15 and 16, for example. That is, the magnetic efficiency can be improved. In the example illustrated in FIG. 2, a position of the upper end in the axial direction where the magnetic pole pattern of the shaft 111 is formed is preferably at the same axial height as the upper end 131U of the air-core coil 131. In addition, a position of the lower end in the axial direction where the magnetic pole pattern of the shaft 111 is formed is preferably at the same axial height as the lower end 131L of the air-core coil 131.

An axial magnetic center of the shaft 111 may coincide with an axial magnetic center of the stator 13. With such a configuration, the magnetic center of the rotor 11 and the magnetic center of the stator 13 can be aligned, and the magnetic efficiency can be improved.

However, the axial magnetic center of the shaft is located axially above the axial magnetic center of the stator 13 in the present example embodiment. With such a configuration, when the motor 100 is driven, a force directed axially downward can be applied to the shaft 111, and the vertical movement of the shaft 111 can be suppressed. As a result, vibration and noise of the motor 100 can be suppressed.

FIG. 4 is a schematic sectional view illustrating the lower bush 16 and a periphery thereof in an enlarged manner. FIG. 4 is an enlarged view of the lower side of FIG. 2. FIG. 5 is a schematic perspective view illustrating a configuration of the lower bush 16. As illustrated in FIGS. 4 and 5, the lower bush 16 includes a bush bottom plate portion 161, a bush cylindrical portion 162, and a bush protruding portion 163.

The bush bottom plate portion 161 expands in a direction orthogonal to the axial direction. In the present example embodiment, the bush bottom plate portion 161 has a rectangular plate shape having cutouts at four corners in plan view from the axial direction. The bush cylindrical portion 162 extends upward from the bush bottom plate portion 161 and holds the lower bearing 122 arranged radially inward. In the present example embodiment, the bush cylindrical portion 162 has a cylindrical shape centered on the central axis A. The lower bearing 122 is fitted into the bush cylindrical portion 162. An inner peripheral surface of the bush cylindrical portion 162 faces an outer peripheral surface of the lower bearing 122 in the radial direction. The lower bearing 122 is fitted to a position where a lower surface thereof abuts against an upper surface of the bush bottom plate portion 161. The lower bearing 122 is fixed to the bush cylindrical portion 162 by press-fitting, press-fitting adhesion, or caulking, for example.

The lower bush 16 is attached to the case 14 by fitting the bush cylindrical portion 162 into the case 14 from the lower portion of the cylindrical case 14. The bush cylindrical portion 162 is fitted into the case 14 to a position where the bush bottom plate portion 161 abuts against a lower end of the case 14.

The bush protruding portion 163 protrudes upward from the bush bottom plate portion 161 and faces a lower end of the shaft 111 in the axial direction. Specifically, the bush protruding portion 163 is arranged at a position overlapping the center of the bush cylindrical portion 162 in plan view from the axial direction. That is, the bush protruding portion 163 is arranged at a position on the upper surface of the bush bottom plate portion 161 through which the central axis A passes. In the present example embodiment, the bush protruding portion 163 is surrounded by an inner peripheral surface of the lower bearing 122 fitted in the bush cylindrical portion 162. The bush protruding portion 163 axially faces the lower end of the shaft 111 fitted to the cylindrical lower bearing 122.

According to the lower bush 16 with such a configuration, the shaft 111 can be received by the bush protruding portion 163, an axial position of the shaft 111 can be stabilized. According to the lower bush 16 with such a configuration, the positional relationship between the axial magnetic center of the shaft 111 and the stator 13 can be stabilized. In the present example embodiment, as a preferable mode, the bush protruding portion 163 is in contact with the lower end of the shaft 111.

In the present example embodiment, as a preferable mode, a distal end of the bush protruding portion 163 is a spherical surface projecting upward. According to such a configuration, a contact area between the shaft 111 and the bush protruding portion 163 can be reduced, and wear of a member during the rotation of the shaft 111 can be suppressed. As a result, it is possible to reduce the possibility that the motor 100 is affected by foreign matter caused by the wear, for example. In addition, the life of the motor 100 can be extended.

As illustrated in FIGS. 4 and 5, the bush bottom plate portion 161 has at least one bush penetrating portion 164 penetrating in the axial direction. At least a part of the bush penetrating portion 164 is preferably arranged radially inward from an outer peripheral surface of the case 14 in a plan view from the axial direction. The bush penetrating portion 164 may be a penetration hole or a cutout. A lead wire 131a of the coil 131 passes through the bush penetrating portion 164 and is connected to a circuit board 17 arranged below the lower bush 16. With such a configuration, the lead wire 131a of the coil 131 can be easily routed to the circuit board 17.

Specifically, the coil 131 is the cylindrical air-core coil as described above. A plurality of the lead wires 131a are drawn out from the air-core coil 131. For example, the number of the lead wires 131a is four in a configuration in which a U phase, a V phase, and a W phase are star-connected, and the number of the lead wires 131a is three in a configuration in which the three phases are delta-connected. The number of the bush penetrating portions 164 may be the same as the number of the lead wires 131a. In this case, a plurality of the bush penetrating portions 164 are provided. However, all or some of the plurality of lead wires 131a may be bundled in the middle to form one lead wire. In such a configuration, the number of the bush penetrating portions 164 may be smaller than the number of lead wires 131a. When all of the plurality of lead wires 131a are bundled into one, the single bush penetrating portion 164 may be provided. Note that the number of the bush penetrating portions 164 is three in the present example embodiment.

The circuit board 17 is provided with, for example, a wiring pattern configured to supply an output current from an external driver (not illustrated) to the air-core coil 131 via the lead wire 131a. A distal end of the lead wire 131a is electrically connected to the circuit board 17 using, for example, solder. The circuit board 17 may be, for example, a rigid board, a flexible board (FPC), a rigid-flexible board, or the like. In the present example embodiment, the circuit board 17 is fixed to a lower surface of the lower bush 16. A method for fixing the circuit board 17 may be, for example, adhesion, screwing, caulking, or the like. In the present example embodiment, a circuit case 18 that covers the circuit board 17 from below is provided. However, the circuit case 18 is not necessarily provided.

In the present example embodiment, the bush cylindrical portion 162 has at least one bush cutout portion 165 extending from an upper end to a lower end in the axial direction. The number of the bush cutout portions 165 is the same as the number of the bush penetrating portions 164. In the present example embodiment, the number of the bush cutout portions 165 is three. However, the number of the bush cutout portions 165 may be more than three or less than three depending on how the lead wire 131a is drawn out from the coil 131 similarly to the bush penetrating portion 164 described above. For example, in a configuration in which two lead wires 131a are drawn out from each phase of the U phase, the V phase, and the W phase and connected on the circuit board 17, the number of the bush cutout portions 165 may be six. Since the bush cutout portions 165 are provided, the bush cylindrical portion 162 is specifically constituted by a plurality of arcuate columnar bodies arranged at intervals in the circumferential direction.

The bush cutout portion 165 overlaps the bush penetrating portion 164 in the axial direction. As a result, the lead wire 131a of the coil 131 can be easily routed to the circuit board 17 using the bush cutout portion 165 and the bush penetrating portion 164. In the present example embodiment, each of the plurality of bush cutout portions 165 overlaps the bush penetrating portion 164 in the axial direction.

FIG. 6 is a schematic sectional view illustrating a configuration of an upper portion of the motor 100 in an enlarged manner. FIG. 6 is an enlarged view of the upper side of FIG. 2. As illustrated in FIG. 6, the motor 100 further includes an annular portion 19 arranged radially outward of the shaft 111 and fixed to the shaft 111. In the present example embodiment, the annular portion 19 is a circular plate-like member centered on the central axis A. The annular portion 19 is made of, for example, metal. The annular portion 19 is fixed to the shaft 111 by press-fitting the shaft 111 therein, for example. The annular portion 19 protrudes radially outward from the outer peripheral surface of the shaft 111.

The annular portion 19 is arranged between the coil 131 and the upper bearing 121 in the axial direction and overlaps the upper bearing 121 in the axial direction. With such a configuration, when the shaft 111 tries to be pulled out upward, the annular portion 19 acts as a stopper, so that the shaft 111 can be prevented from being pulled out upward.

In the present example embodiment, the annular portion 19 is arranged below the upper bush 15 whose lower end is located below a lower end of the upper bearing 121, and overlaps the upper bush 15 in the axial direction. For this reason, the annular portion 19 exerts a function as the stopper by coming into contact with the upper bush 15. However, there is a case where the annular portion 19 does not overlap the upper bush 15 in the axial direction, for example, in a circumstance where it is difficult to increase a radial size of the annular portion 19 or a structure in which it is difficult to provide the bush inner annular portion 152. Even in such a case, the annular portion 19 overlaps the upper bearing 121 in the axial direction, and thus, the annular portion 19 exerts the function as the stopper by coming into contact with the upper bearing 121.

FIG. 7 is a schematic view for describing a preferable structure of the motor 100. FIG. 7 is a view illustrating a part of the cross section illustrated in FIG. 2. Specifically, FIG. 7 illustrates the upper portion and the lower portion of the motor 100, and omits an intermediate portion of the motor 100. As illustrated in FIG. 7, as a preferable mode, an axial distance D1 between the upper bearing 121 and the annular portion 19 is smaller than an axial distance D2 between an upper end of the bush protruding portion 163 and an upper end of the lower bearing 122. With such a configuration, the annular portion 19 functions as the stopper, and the shaft 111 can be prevented from being pulled out of the lower bearing 122.

FIG. 8 is a view for illustrating a first modification of the motor 100 according to the example embodiment of the present disclosure. FIG. 8 is a transverse sectional view of a motor 100A according to the first modification taken along a direction orthogonal to the central axis A. The motor 100A according to the first modification is different from the stator 13 according to the above-described example embodiment in terms of a configuration of a stator 13A. The stator 13A includes a coil 131A facing an outer peripheral surface of a magnetized shaft 111A in the radial direction, which is similar to the above-described example embodiment. In FIG. 8, the coil 131A is indicated by a broken line. A detailed configuration of the coil 131A is different from that of the above-described example embodiment. A plurality of the coils 131A are arranged in the circumferential direction.

The stator 13A further includes a stator core 133. For example, the stator core 133 includes magnetic steel plates laminated in the axial direction. The stator core 133 includes a core back 1331 and a tooth 1332. The core back 1331 has an annular shape centered on the central axis A. Specifically, the core back 1331 has a circular shape. A plurality of the teeth 1332 protrude radially inward from the core back 1331 and are arrayed in the circumferential direction. Although a case where the number of the teeth 1332 is four is exemplified in the present modification, but the number of the teeth 1332 may be changed according to the number of magnetic poles of the shaft 111A.

The tooth 1332 includes a tooth body portion 1332a and an umbrella portion 1332b. A conductive wire forming the coil 131A is wound around the tooth body portion 1332a. The umbrella portion 1332b is arranged at a distal end of the tooth body portion 1332a and expands in the circumferential direction. When the stator 13A is configured as in the present modification, a radial interval between the shaft 111A having a function as a magnet and the stator core 133 can be reduced, and magnetic characteristics can be improved.

In the present modification, a case 14A is arranged radially outward of the core back 1331. However, the motor 100A does not necessarily include the case 14A.

FIG. 9 is a view for illustrating a second modification of the motor 100 according to the example embodiment of the present disclosure. FIG. 9 is a longitudinal sectional view of a motor 100B according to the second modification taken along a plane including the central axis A. As illustrated in FIG. 9, the motor 100B according to the second modification also includes a lower bush 16B that holds a lower bearing 122B supporting a lower portion of a shaft 111B. The lower bush 16B includes a bush bottom plate portion 161B, a bush cylindrical portion 162B, a bush protruding portion 163B, and a bush penetrating portion 164B, which is similar to the above-described example embodiment. However, the bush cylindrical portion 162B does not have the above-described bush cutout portion 165 (see FIG. 5 and the like) in the present modification.

An inner peripheral surface of a cylindrical body 132B surrounding an outer peripheral surface of the bush cylindrical portion 162B faces the outer peripheral surface of the bush cylindrical portion 162B in the radial direction. In the present modification, the cylindrical body 132B is a cylindrical back yoke. A configuration of the back yoke 132B is similar to that of the above-described example embodiment. That is, the lower bush 16B is fitted into the back yoke 132B from the lower side of the back yoke 132B in the present modification. Note that the cylindrical body 132B may be a case arranged radially outward of the back yoke 132B, instead of the back yoke 132B. In this case, the lower bush 16B is fitted into the case.

The inner peripheral surface of the cylindrical body 132B has at least one cutout groove 132Ba extending in the axial direction. The number of the cutout grooves 132Ba is a number corresponding to the number of lead wires 131aB of a coil 131B or the number of bundles of the lead wires 131aB. The cutout groove 132Ba may have, for example, a semicircular shape recessed radially outward from the inner peripheral surface of the cylindrical body 132B in plan view from the axial direction.

The cutout groove 132Ba axially overlaps the bush penetrating portion 164B provided in the bush bottom plate portion 161B to penetrate in the axial direction. According to such a configuration, a space for routing the lead wire 131aB of the coil 131B can be secured by the cutout groove 132Ba, so that the lead wire 131aB can be easily processed.

Note that the lead wire 131aB is electrically connected to a circuit board 17B as in the above-described example embodiment.

In the present modification, as a preferable mode, an upper end portion of the cutout groove 132Ba is located between a lower end portion of the coil 131B and an upper end portion of the bush cylindrical portion 162B in the axial direction. Accordingly, when the lead wire 131aB of the coil 131B is processed, the lead wire 131aB can easily pass through the cutout groove 132Ba. That is, the assemblability of the motor 100B can be improved.

FIG. 10 is a view for illustrating a third modification of the motor 100 according to the example embodiment of the present disclosure. FIG. 10 is a view schematically illustrating a cross section of a shaft 111C provided in the motor according to third modification taken along a plane orthogonal to the axial direction.

As illustrated in FIG. 10, the shaft 111C has a coating layer 1112 arranged on an outer peripheral surface thereof in the present modification. The coating layer 1112 is made of a material different from a material forming a magnetization pattern. Specifically, the shaft 111C includes a shaft body portion 1111 and the coating layer 1112 covering an outer peripheral surface of the shaft body portion 1111. The shaft body portion 1111 is made of, for example, a magnet material such as a rare earth magnet, and has, for example, a cylindrical shape. As a preferable mode, the coating layer 1112 covers the entire shaft body portion 1111.

With such a configuration, it is possible to prevent the shaft body portion 1111 made of the magnet material from rusting, and it is possible to suppress deterioration of magnetic characteristics of the motor. Since the coating layer 1112 is provided, it is possible to reduce a loss caused by friction during the rotation of the shaft 111C. In addition, the rigidity of the shaft 111C can be improved since the coating layer 1112 is provided.

The coating layer 1112 may be configured by surface-treating the shaft body portion 1111 made of the magnet material, for example. Specifically, the coating layer 1112 may be configured by plating the surface of the shaft body portion 1111. The coating layer 1112 formed by the plating may be, for example, a nickel plating layer.

Various technical features disclosed in the present description can be variously modified in a scope without departing from the gist of the technical creation. The plurality of example embodiments and modifications illustrated in the present description may be carried out in combination as far as possible.

The technology of the present disclosure can be widely used for motors used in, for example, home appliances, automobiles, ships, aircraft, trains, robots, and the like.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
a shaft centered on a central axis extending vertically;
an upper bearing that supports an upper portion of the shaft;
a lower bearing that supports a lower portion of the shaft;
an upper bush that holds the upper bearing; and a stator including a coil opposing an outer peripheral surface of the shaft in a radial direction;
wherein the shaft includes a magnetization pattern in which at least two or more poles of N and S poles are alternately arranged in a circumferential direction; and
a portion of the upper bearing protrudes axially upward beyond an axially uppermost portion of the upper bush;
wherein an axial magnetic center of the shaft is located axially above an axial magnetic center of the stator.

2. The motor according to claim 1, wherein
the stator includes:
   an air-core coil that defines the coil and has a cylindrical shape extending in an axial direction; and
   a back yoke that is radially outward of the air-core coil and has a cylindrical shape extending in the axial direction; and
an outer peripheral surface of the air-core coil is fixed to an inner peripheral surface of the back yoke.

3. The motor according to claim 2, wherein
an upper end and a lower end of the air-core coil are between an upper end and a lower end of the back yoke in the axial direction.

4. The motor according to claim 1, wherein
the stator further includes a stator core;
the stator core includes:
   a core back having an annular shape centered on the central axis; and
   teeth protruding radially inward from the core back and arrayed in the circumferential direction; and
each of the teeth includes:
   a tooth body portion around which a conductive wire defining the coil is wound; and
   an umbrella portion that is at a distal end of the tooth body portion and expands in the circumferential direction.

5. The motor according to claim 1, further comprising:
a lower bush that holds the lower bearing; wherein
the lower bearing is radially outward of the shaft; and
the lower bush includes:
   a bush bottom plate portion expanding in a direction orthogonal to the axial direction;
   a bush cylindrical portion extending upward from the bush bottom plate portion and holding the lower bearing radially inward; and
   a bush protruding portion protruding upward from the bush bottom plate portion and opposing a lower end of the shaft in the axial direction.

6. The motor according to claim 5, wherein
a distal end of the bush protruding portion is a spherical surface projecting upward.

7. The motor according to claim 5, wherein
the bush bottom plate portion includes at least one bush penetrating portion penetrating in the axial direction; and
a lead wire of the coil passes through the bush penetrating portion and is connected to a circuit board below the lower bush.

8. The motor according to claim 7, wherein
the bush cylindrical portion includes at least one bush cutout portion extending from an upper end to a lower end in the axial direction; and
the bush cutout portion overlaps the bush penetrating portion in the axial direction.

9. The motor according to claim 7, wherein
an inner peripheral surface of a cylindrical body surrounding an outer peripheral surface of the bush cylindrical portion includes at least one cutout groove opposing the outer peripheral surface of the bush cylindrical portion in the radial direction and extending in the axial direction; and
the cutout groove overlaps the bush penetrating portion in the axial direction.

10. The motor according to claim 9, wherein an upper end portion of the cutout groove is between a lower end portion of the coil and an upper end portion of the bush cylindrical portion in the axial direction.

11. The motor according to claim 5, further comprising:
the upper bush includes an annular portion radially outward of the shaft and fixed to the shaft; wherein
the upper bearing is radially outward of the shaft;
the annular portion is between the coil and the upper bearing in the axial direction, and overlaps the upper bearing in the axial direction; and
an axial distance between the upper bearing and the annular portion is smaller than an axial distance between an upper end of the bush protruding portion and an upper end of the lower bearing.

12. The motor according to claim 1, further comprising:
the upper bush includes an annular portion radially outward of the shaft and fixed to the shaft; wherein
the upper bearing is radially outward of the shaft; and
the annular portion is between the coil and the upper bearing in the axial direction and overlaps the upper bearing in the axial direction.

13. The motor according to claim 1, wherein an axial magnetic center of the shaft coincides with an axial magnetic center of the stator.

14. The motor according to claim 1, further comprising a case that is radially outward of the stator and surrounds the stator.

15. The motor according to claim 1, wherein the shaft includes a coating layer that is made of a material different from a material defining the magnetization pattern and is on the outer peripheral surface.

16. The motor according to claim 1, wherein an axial range in which the magnetization pattern of the shaft is defined is a range overlapping the coil in the radial direction.

* * * * *